United States Patent Office 2,724,811
Patented Nov. 22, 1955

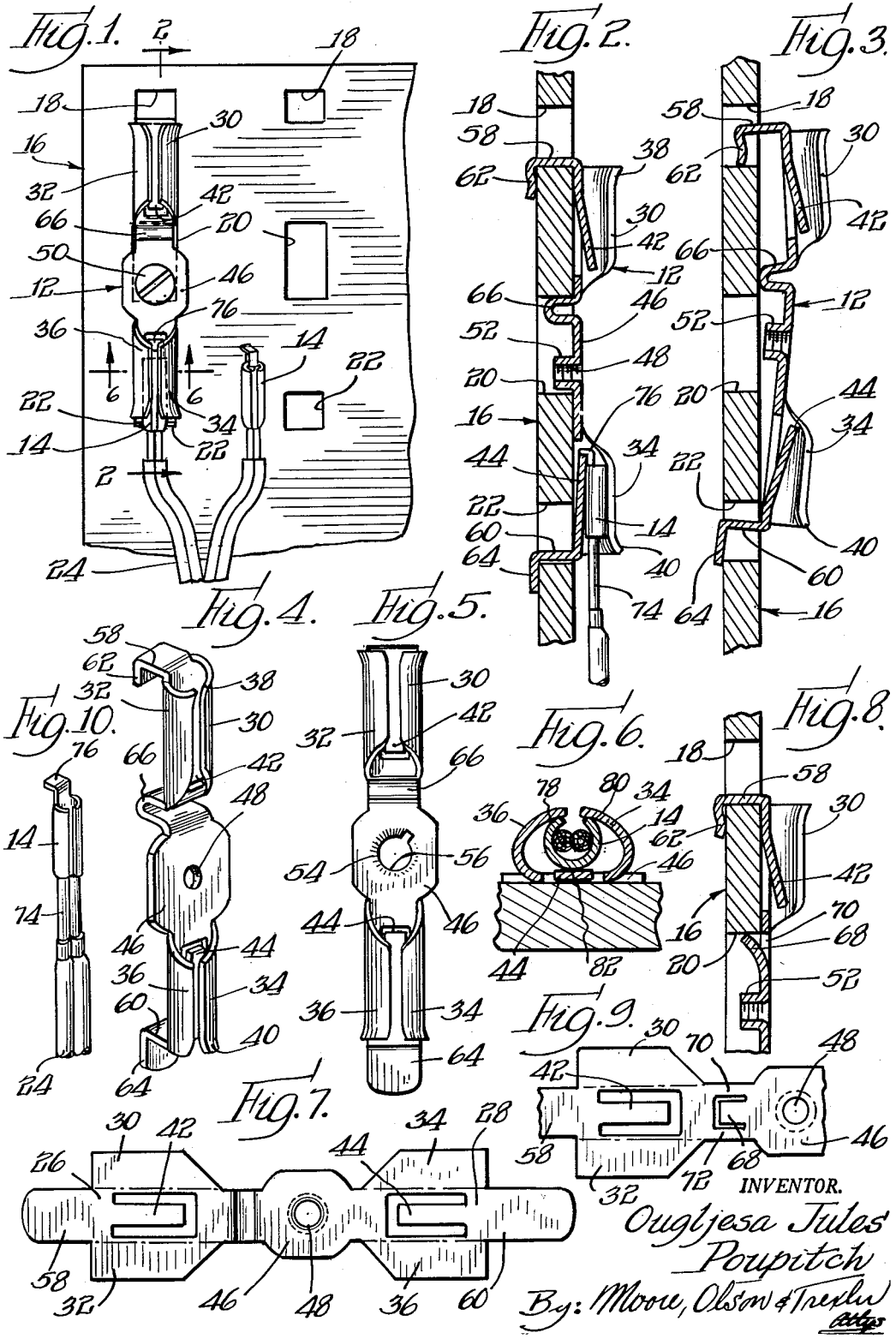

2,724,811

TERMINAL CLIP FOR PANEL MOUNTING

Ougljesa Jules Poupitch, Chicago, Ill., assignor to Illinois Tool Works, Chicago, Ill., a corporation of Illinois Application April 13, 1953, Serial No. 348,431

8 Claims. (Cl. 339—132)

The present invention relates to a novel electrical terminal device, and more particularly to a novel device adapted to provide an electrical connection between a plurality of electrical conduits.

Many devices of the above general description have been provided which include an electrical conduit receiving clip adapted to be mounted on a suitable panel. In general, these previous clips have been connected to the panel by auxiliary fastening means, such as screws or rivets, whereby such assembly is made relatively difficult and expensive. It is, therefore, an object of the present invention to provide a novel terminal clip which may be quickly and easily assembled with a suitable panel without using auxiliary fastening means, such as rivets or screws and the like.

Another object of the present invention is to provide a novel terminal clip of the above described type which may be easily and economically manufactured from sheet material stock.

Another object of the present invention is to provide a novel device of the above described general type, wherein an electrical conduit may be quickly and easily assembled with the terminal clip and securely held in electrical contact with the clip.

Other objects and advantages of the present invention will become apparent from the following description and the accompanying drawings, wherein:

Fig. 1 is a plan view, showing a novel device embodying the principles of this invention mounted on a suitable panel;

Fig. 2 is an enlarged cross sectional view taken along line 2—2 in Fig. 1;

Fig. 3 is a cross sectional view similar to Fig. 2 and showing the method of assembling the novel terminal clip of this invention with a panel;

Fig. 4 is a perspective view of a novel terminal clip of this invention;

Fig. 5 is a plan view of a terminal clip embodying a slightly modified form of this invention;

Fig. 6 is an enlarged fragmentary cross sectional view taken along line 6—6 in Fig. 1;

Fig. 7 is a plan view, showing a partially preformed blank from which the terminal clips of Figs. 1 through 6 may be manufactured;

Fig. 8 is a fragmentary cross sectional view similar to Fig. 2 and showing a modified form of this invention;

Fig. 9 is a fragmentary plan view of a blank used to form the terminal clip of Fig. 8; and Fig. 10 is a perspective view, showing a novel electrical conduit terminal of this invention.

Referring now more specifically to the drawings, wherein like parts are designated by the same numerals throughout the various figures, a novel device embodying the present invention is shown best in Fig. 1 and includes a terminal clip 12 for receiving a terminal 14 and mounted on a suitable panel 16. The panel 16 is constructed from any suitable insulating material and is provided with a plurality of spaced openings 18, 20, and 22 for receiving panel engaging portions of the terminal clip, as fully described hereinbelow. As shown in Fig. 1, two sets of openings 18 to 22 are normally provided in side-by-side relationship, whereby a pair of the terminal clips 12 may be mounted adjacent to each other on the panel for receiving a pair of terminals 14 on a two-wire electrical conduit 24. In Fig. 1, the second terminal clip 12 has been omitted for the purpose of better illustration.

A blank from which the terminal clip 12 may be formed is shown best in Fig. 7. This blank includes an elongated body section having opposite end portions 26 and 28. Integral extensions 30 and 32 project laterally from opposite margins of the end portion 26, and similar extensions 34 and 36 extend from opposite margins of the end portion 28. These lateral extensions are bent to form generally tubular housings, as shown best in Figs. 1, 4, and 6 for receiving terminals 14. Preferably, the ends of the extensions are flared outwardly, as at 38 and 40 (see Figs. 2 and 4) in order to provide enlarged mouths for the housings, thus facilitating the insertion of the terminals 14. As shown best in Figs. 2, 3, and 7, resilient fingers 42 and 44 are struck from the end portions 26 and 28, respectively, and are bent so that the fingers project into the housings, whereby the terminals 14 will be resiliently gripped between the fingers and the internal walls of the housings.

A mid portion of the terminal clip body section is enlarged, as at 46. This enlarged portion is provided with a centrally located aperture 48 for receiving a headed screw element 50. This screw may be utilized to connect an additional electrical conduit to the terminal clip in a well known manner. The aperture 48 is preferably defined by helical threads to cooperate with the threads on the screw 50. In the embodiments shown in Figs. 2, 3, and 7, these helical threads are formed on the inner surface of a sleeve 52, which sleeve is drawn from the enlarged portion 46 of the body section. In the embodiment shown in Fig. 5, the enlarged portion 46 has been embossed, as at 54, so that the inner edge 56 thereof defines a helical thread.

In accordance with a feature of this invention, means is provided for securing the terminal clip to the panel 16. This means includes tabs 58 and 60 extending from opposite ends of the body section. As shown best in Fig. 2, the tabs extend generally perpendicularly from the body section and terminate in hook portions 62 and 64, respectively. It should be noted that these hook portions extend in the same direction. With this arrangement, when the tabs are inserted through the apertures 18 and 22 in the panel, it will be seen that the tabs will engage the edges of the apertures so that the terminal clip is held against movement relative to the panel in one direction. In order to prevent movement of the terminal clip relative to the panel in the opposite direction, abutment means is provided for extending into the aperture 20 and engaging a wall of the panel defining said aperture. The terminal clip will thus be held in the position shown in Fig. 2 with the hooking portions 62 and 64 of the tabs engaging the inner surface of the panel. In the embodiment shown in Figs. 1 through 7, this abutment means is provided by a depending looped or generally U-shaped portion 66. The embodiment shown in Figs. 8 and 9 is substantially identical to the previously described embodiment, except that the abutment means is provided by a resilient finger 68 struck from the body section and formed so as to depend downwardly therefrom.

When the terminal clip is assembled with the panel 16, the hook portion 64 of the tab 60 is first inserted through the aperture 22 and positioned in engagement with the inner surface of the panel, as shown in Fig. 3. In this position, it will be noted that the abutment provided by the looped portion 66 engages the outer surface of the panel so that the tab 58 cannot extend completely through the aperture 18 in the panel. However, in order to insert the tab 58 completely through the aperture, it is merely necessary to press on the housing formed by the lateral extensions 30 and 32, and this action causes the body section to flex sufficiently to enable the hook portion 62 to engage under the panel. It should be noted that the looped portion 66 provides in effect relatively highly flexible resilient hinge connection between the opposite ends of the body section to facilitate the application of the tab 58 through the aperture, as described. In addition, the loop portion 66 provides a fulcrum about which the end portions of the body section pivot during the application of the terminal clip to the panel. After the body section has been flexed or bent sufficiently to enable the hook portion 62 to engage under the panel, it is merely necessary to move the clip downwardly when viewed in Fig. 3 until the looped portion 66 snaps into the aperture 20 and the hook portions 62 and 64 engage the under surface of the panel, as shown in Fig. 2.

The application of the embodiment of the terminal clip shown in Figs. 8 and 9 to a panel may be accomplished in the manner described above for the terminal clip 12. In this embodiment, the striking of the resilient finger 68 from the body section results in a pair of relatively narrow and flexible connecting portions 70 and 72 which in effect provide a flexible hinge between the opposite ends of the body section. These portions 70 and 72 function in the same manner as the above described looped portion 66 for permitting the body section to be flexed to enable the tab 58 to be inserted through the aperture in the panel. In addition, the resilient finger 68 which engages the outer surface of the panel when the tab 60 is first inserted through the panel, as shown in Fig. 3, will flex outwardly until the clip has been moved to its finally assembled position at which time the finger assumes the position shown in Fig. 8 and thus locks the clip in position.

The terminal 14 for the electrical conductor 24 includes a generally split tubular sleeve which is crimped, as at 74, to secure the sleeve to the wire. As shown best in Figs. 2 and 10, a short tab 76 extends generally radially from the terminal and is adapted to engage the end of the spring fingers within the terminal clip housings so that the terminals will be positively locked against removal from the housings.

The terminals 14 may easily be assembled within the housings of the terminal clip merely by pressing the terminals axially into the housings. The spring fingers within the housings press the terminals against the inner walls of the housings to insure a good electrical contact. As shown best in Fig. 6, the housings provided by the lateral extensions are preferably slightly flattened with the edges of the extensions spaced apart. This structure in combination with the resilient fingers within the housings assures that the terminal will contact the clip at three points, illustrated at 78, 80, and 82. This three-point contact insures a good electrical contact at all times.

From the above description, it is seen that the present invention has provided a novel terminal clip which may be readily assembled with a suitable panel without utilizing any auxiliary fastening means. Furthermore, it is seen that the present invention has provided a novel terminal clip which may be easily and economically manufactured from sheet material.

Furthermore, the present invention has provided a novel terminal device, wherein a terminal on an electrical conduit may be readily and securely connected with the terminal clip in a manner to insure good electrical contact.

While the preferred embodiments of the present invention have been shown and described herein, it is obvious that many changes may be made in the structural details without departing from the spirit and scope of the appended claims.

I claim:

1. In a one piece sheet metal clip for attachment to one surface of an apertured panel, a body section, article accommodating means on said body section, tab means extending laterally of said body section and including a pair of hook-like sections facing in the same direction adapted to be received by spaced apertures of a panel so as to overlie and thus attachingly embrace the opposite panel surface, abutment means in the form of a resilient finger struck from the body section positioned intermediate said hook-like sections and extending from the same side of said body section in position for engagement with a wall of an aperture in said panel when said hook-like sections occupy their panel overlying positions, said body section being cooperatively disposed to maintain said struck out abutment means in telescopic association with a complementary panel aperture when said hook-like sections occupy their positions of panel attachment.

2. In a one piece sheet metal clip for attachment to one surface of an apertured panel, a body section, article accommodating means on said body section, tab means extending laterally of said body section and including a pair of hook-like sections facing in the same direction adapted to be received by spaced apertures of a panel so as to overlie and thus attachingly embrace the opposite panel surface, abutment means in the form of a loop portion positioned intermediate said hook-like sections and extending from the same side of said body section in position for engagement with a wall of an aperture in said panel when said hook-like sections occupy their panel overlying positions, said body section being sufficiently resilient yieldably to urge said abutment means into telescopic association with a complementary panel aperture when said hook-like sections occupy their positions of panel attachment.

3. In a one piece sheet metal clip for attachment to one surface of an apertured panel, a body section, article accommodating means on said body section including a generally tubular housing for receiving a terminal end of an article such for example as an electrical conductor, tab means extending laterally from said body section and including a pair of hook-like sections facing in the same direction adapted to be received by spaced apertures of a panel so as to overlie and thus attachingly embrace the opposite panel surface, abutment means positioned intermediate said hook-like sections and extending from the same side of said body section in position to be accommodated by a wall of an aperture in said panel when said hook-like sections occupy their panel overlying positions, said body section and abutment means being cooperatively disposed yieldably to urge said abutment means into association with a complementary panel aperture when said hook-like sections occupy their positions of panel attachment.

4. In a terminal device, a one piece sheet material terminal clip adapted to be mounted on one surface of a panel, comprising a body section, tab means extending laterally from adjacent one end of the body section, a second tab means extending laterally from adjacent the opposite end of said body section, each of said tab means terminating in hook portions for engaging a surface of the panel facing generally oppositely from said one surface, said hook portions being disposed so as to extend substantially in the same direction, abutment means extending laterally from said body section between said tab means for entering an aperture in the panel and engaging a wall of the panel defining said aperture, whereby to retain the clip in assembled relationship with the panel, resilient flexible hinge means connecting opposite ends of the body section to facilitate application of said terminal clip to the panel, marginal extension means on one end of the body section providing a generally tubular housing for receiving a terminal end of an electrical conductor, and a resilient finger struck from said body section and extending into said housing for pressing a terminal end of a conductor into electrical contact with the walls of said housing.

5. A device, as defined in claim 4, which includes marginal extension means on opposite ends of said body section and providing a pair of generally tubular housings for receiving terminal ends of electrical conductors, said body section having an aperture therethrough between said housings, and means providing a helical thread defining said aperture for accommodating a screw element, whereby another electrical conductor may be connected with the body section by said screw element.

6. A device, as defined in claim 5, wherein said aperture is defined by a sleeve drawn from said body section, and said helical thread defines the internal wall of said sleeve.

7. A device, as defined in claim 4, which includes an electrical conductor terminal insertable within said housing, said terminal having tab means engageable with an end of said resilient finger for preventing removal of the terminal from the housing.

8. A device, as defined in claim 4, wherein said marginal extension means is flared outwardly to provide said housing with an enlarged mouth for facilitating the insertion of a terminal end into said housing.

References Cited in the file of this patent

UNITED STATES PATENTS

| | | |
|---|---|---|
| 1,519,972 | Harth | Dec. 16, 1924 |
| 1,595,919 | Paiste | Aug. 10, 1926 |
| 1,983,470 | Knape | Dec. 4, 1934 |
| 2,127,280 | Zimbalist | Aug. 16, 1938 |
| 2,200,047 | Tinnerman | May 7, 1940 |
| 2,233,718 | Soreng | Mar. 4, 1941 |
| 2,274,454 | Murphy | Feb. 24, 1942 |
| 2,434,211 | Hull et al. | Jan. 6, 1948 |
| 2,581,967 | Mitchell | Jan. 8, 1952 |
| 2,602,205 | Davis | July 8, 1952 |